(12) United States Patent
Radanitsch

(10) Patent No.: US 12,097,643 B2
(45) Date of Patent: Sep. 24, 2024

(54) DEVICE FOR PREPARING COMPOSITE MATERIAL WASTE

(71) Applicant: Jörg Radanitsch, Gmunden (AT)

(72) Inventor: Jörg Radanitsch, Gmunden (AT)

( * ) Notice: Subject to any disclaimer, the term of this patent is extended or adjusted under 35 U.S.C. 154(b) by 327 days.

(21) Appl. No.: 17/630,155

(22) PCT Filed: Jul. 15, 2020

(86) PCT No.: PCT/AT2020/060271
§ 371 (c)(1),
(2) Date: Jan. 25, 2022

(87) PCT Pub. No.: WO2021/011976
PCT Pub. Date: Jan. 28, 2021

(65) Prior Publication Data
US 2022/0281139 A1   Sep. 8, 2022

(30) Foreign Application Priority Data
Jul. 25, 2019   (AT) .............. A 50676/2019

(51) Int. Cl.
*B29B 17/02*   (2006.01)
*B29B 7/66*   (2006.01)
(Continued)

(52) U.S. Cl.
CPC .......... *B29B 17/02* (2013.01); *B29B 17/0026* (2013.01); *B29K 2105/0872* (2013.01);
(Continued)

(58) Field of Classification Search
CPC ..... B02C 21/02; B02C 21/026; B02C 19/186; B02C 25/00; B02C 23/08; B02C 18/142;
(Continued)

(56) References Cited

U.S. PATENT DOCUMENTS 3,995,819 A * 12/1976 Kunogi .................... B22C 5/18
  241/58
5,251,832 A   10/1993 Hentschel
(Continued)

FOREIGN PATENT DOCUMENTS

AT   508702 B1 *   4/2011
DE   2550879 A1   5/1976
(Continued)

OTHER PUBLICATIONS

English translate (JPH09300348A), retrieved date Feb. 13, 2024.*
English translate (AT508702B1), retrieved date Feb. 13, 2024.*

*Primary Examiner* — Mohammed S. Alawadi
(74) *Attorney, Agent, or Firm* — Tiajoloff & Kelly LLP

(57) ABSTRACT

The invention relates to a device for preparing composite material waste, in particular carbon fiber-reinforced waste, comprising a comminuting assembly (2) for the composite material waste, a downstream temperature control zone (3) for controlling the temperature of the comminuted composite material waste, and a forming unit (4) for producing composite material waste compacts. In order to provide companies without recycling facilities, regardless of the type of composite material waste, with a low-cost and environmentally friendly alternative to dumping harmful composite material waste in landfills, it is proposed that the comminuting assembly (2), the temperature control zone (3) and the forming unit (4) are arranged in an at least substantially hermetically sealed and transportable working chamber (1).

12 Claims, 2 Drawing Sheets

Figure 1:
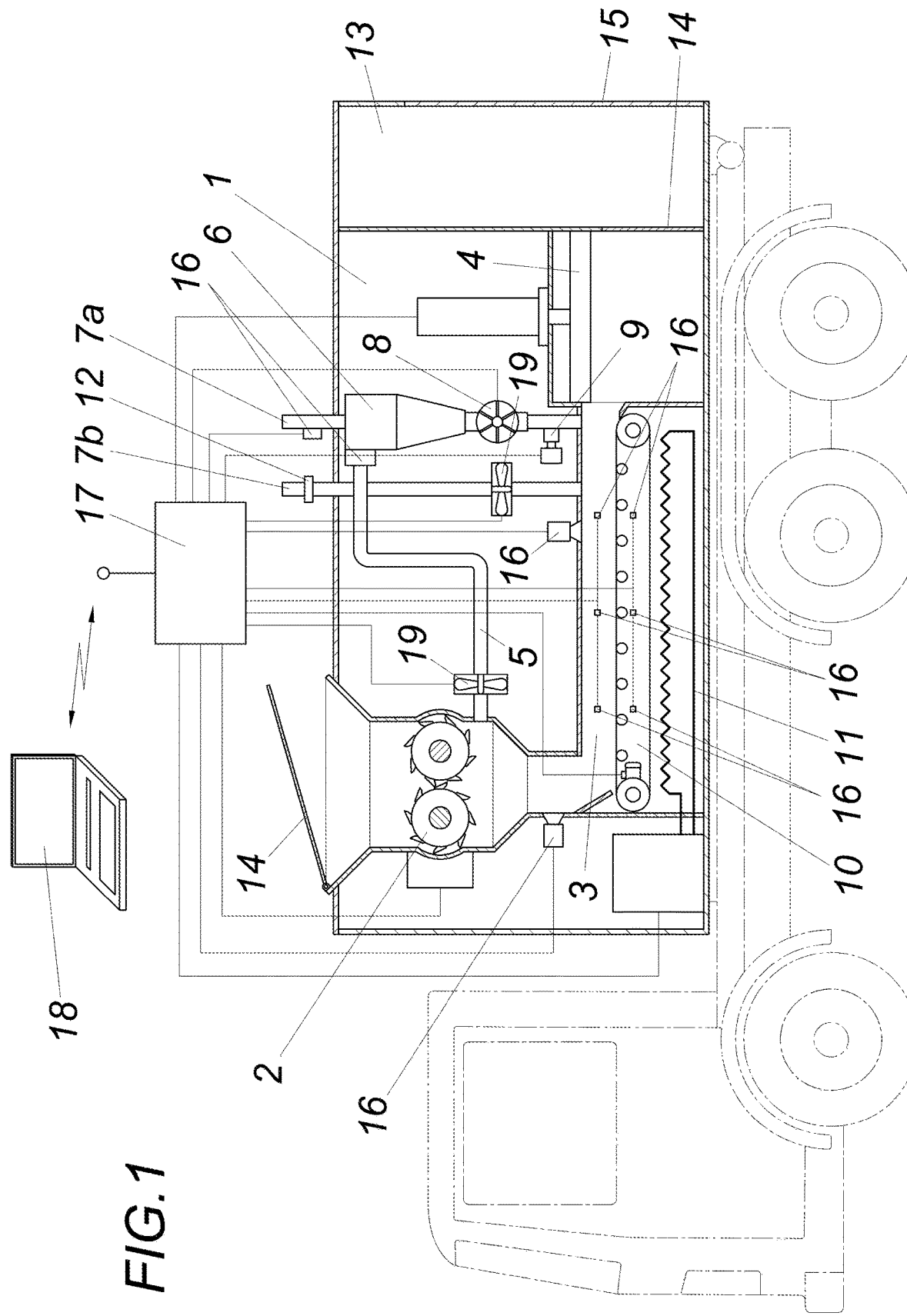

(51) Int. Cl.
    *B29B 7/88*       (2006.01)
    *B29B 17/00*     (2006.01)
    *B29B 17/04*     (2006.01)
    *B29C 31/04*     (2006.01)
    *B29C 35/02*     (2006.01)
    *B29C 43/04*     (2006.01)
    *B29C 43/34*     (2006.01)
    *B29K 105/08*    (2006.01)
    *B29K 105/24*    (2006.01)
    *B29K 105/26*    (2006.01)
    *B29K 307/04*    (2006.01)

(52) U.S. Cl.
    CPC .... *B29K 2105/246* (2013.01); *B29K 2105/26* (2013.01); *B29K 2307/04* (2013.01)

(58) Field of Classification Search
    CPC . B02C 2201/06; B29B 17/02; B29B 17/0026; B29B 17/00; B29B 7/66; B29B 7/885; B29B 2017/0094; B29B 2017/0468; B29K 2105/0872; B29K 2105/246; B29K 2105/26; B29K 2105/24; B29K 2307/04; B29C 43/34; B29C 31/04; B29C 35/02; Y02W 30/62
    See application file for complete search history.

(56) References Cited

U.S. PATENT DOCUMENTS 6,258,877 B1 * 7/2001 Zen ............... B29B 17/0042
                                          264/331.12
2019/0054662 A1    2/2019  Ahmed et al.

FOREIGN PATENT DOCUMENTS

| | | |
|---|---|---|
| DE | 4106942 A1 | 9/1992 |
| EP | 2108495 A1 | 10/2009 |
| JP | 09-300348 | 11/1997 |
| JP | H09300348 A * | 11/1997 |
| WO | 2010148418 A1 | 12/2010 |

* cited by examiner

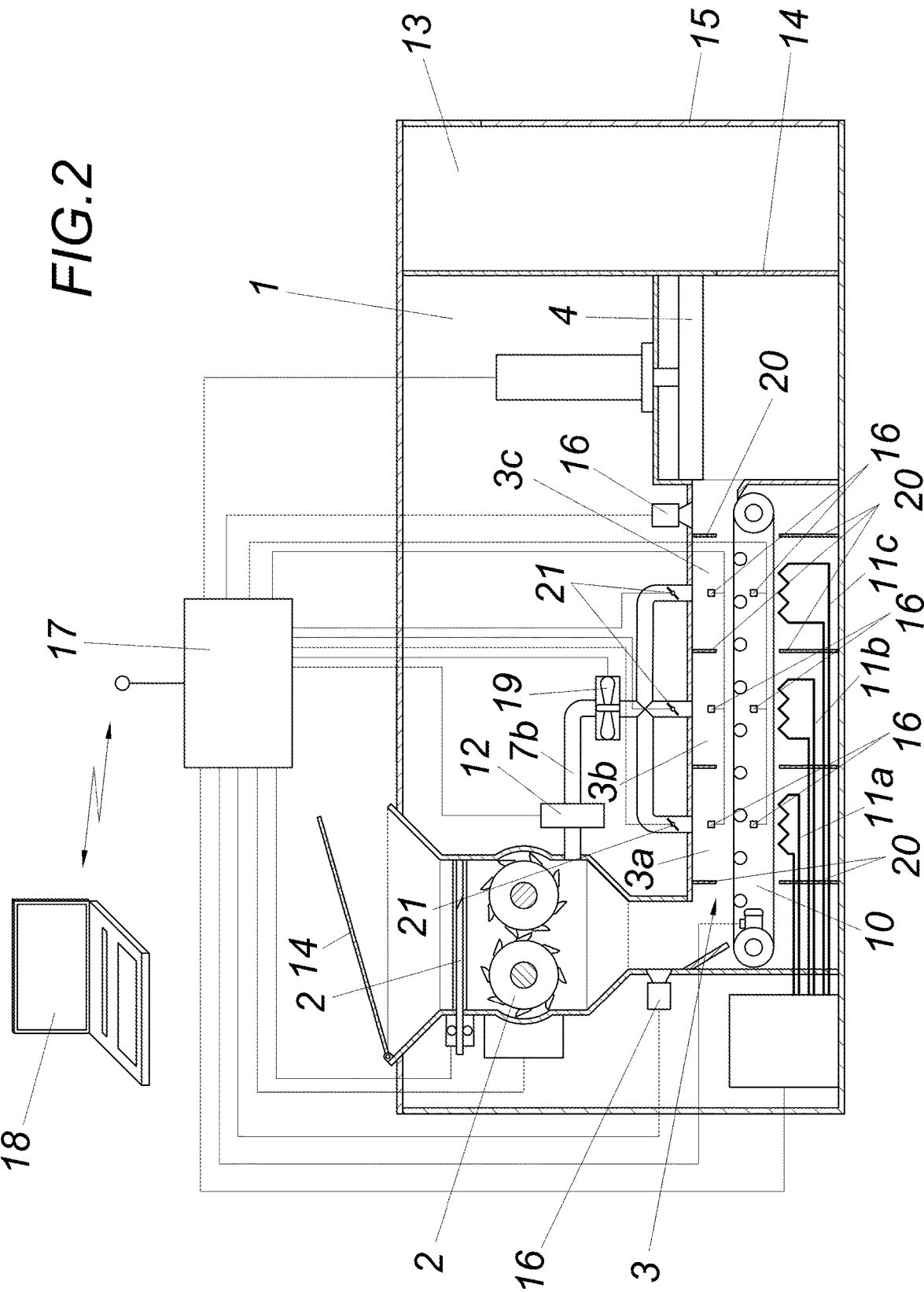

DEVICE FOR PREPARING COMPOSITE MATERIAL WASTE

FIELD OF THE INVENTION

The invention relates to a device for preparing composite material waste, in particular carbon fiber-reinforced and glass fiber-reinforced waste, comprising a comminuting assembly for the composite material waste, a downstream temperature control zone for controlling the temperature of the comminuted composite material waste, and comprising a forming unit for producing composite material waste compacts. The invention further relates to a method for preparing composite material waste, in particular carbon fiber-reinforced waste, in which the composite material waste is comminuted in a first method step by a comminuting assembly, then temperature-controlled in a temperature control zone and subsequently pressed by a forming unit to form composite material waste compacts.

DESCRIPTION OF THE PRIOR ART

Composite materials are materials consisting of several materials whose material properties differ from those of the individual materials. Widely known composite materials are carbon fiber-reinforced plastics (CFRP), colloquially known as carbon fiber or carbon, which essentially consist of carbon fibers embedded in a plastic matrix, and glass fiber-reinforced plastics (GFRP), which consist of glass fibers embedded in a plastic matrix. It is well known to use prepregs for the production of CFRP and GFRP components. Prepregs are fiber-matrix semi-finished products that are cured or crosslinked only through pressure and temperature treatment and obtain their desired material properties. Usually, such prepregs are wound on large rolls and are cut to size by the paver as required, which clearly results in large amounts of waste. Depending on the type of prepreg, however, these have various additives, such as solvents, which are, however, highly flammable, cause skin irritation and can be lethal if they enter the human respiratory tract. Composite materials, in particular prepregs, must therefore be disposed of or recycled properly.

US20190054662A1 describes a method for recycling uncrosslinked carbon fiber-reinforced prepregs, in which uncrosslinked prepreg waste is first shredded, then filled into a mold and finally subjected to hot forming. However, the disadvantage of this method is that it is only directed at uncrosslinked carbon fiber-reinforced prepregs. However, the production and recycling of composites generates waste of different properties, the safe processing of which cannot be handled by previously known methods or devices without costly extensions. Smaller companies in particular cannot afford such special devices or special methods, which is why landfilling of the waste is often preferred. However, this in turn has the disadvantage that volatile, toxic components are already released untreated during transport to the landfills.

DE4106942A1 shows a device for preparing plastic waste with a comminuting assembly and an extruder. The individual production units are each sealed off from the environment in a transport unit. The disadvantage of this is that reshaping of composite material waste by means of an extruder is not possible, on the one hand, because of the cured state of the composite material waste and, on the other hand, because of its residual fiber content. In addition, the device requires assembly of the individual production units by a specialist, as otherwise any volatile toxic substances could be released into the environment if the assembly is not carried out properly.

EP2108495A1 describes devices for compacting composite material waste with a forming unit for producing composite material waste compacts. The forming unit can be followed by a temperature control zone and a comminuting assembly.

SUMMARY OF THE INVENTION

The invention is thus based on the object of proposing a device of the type described at the beginning, which also offers companies without recycling plants a low-cost and environmentally friendly alternative to the dumping of harmful composite material waste in landfills, regardless of the type of composite material waste.

The invention solves the problem posed by arranging the comminuting assembly, the temperature control zone and the forming unit in an at least substantially hermetically sealed and transportable working chamber. As a result of these measures, the device can be used temporarily and locally unbound by different companies. The mobile device can be rented, for example, wherein an establishment of a municipal waste management ring is also conceivable if the transportable working chamber is designed as a container on, for example, a truck. In order that the device can be parked at any location without having to take further safety precautions, the working chamber is substantially hermetically separated from its surroundings. Here, substantially is intended to mean that airlocks or flaps for loading and unloading, or openings for fresh air or exhaust air lines and the like, may be provided to penetrate the working chamber. The working chamber thereby provides a compact and transportable space for a comminuting assembly, which may be designed, for example, as a shredder or guillotine. Naturally, other comminuting assemblies obvious to the person skilled in the art, as well as a combination of known comminuting assemblies, can also be provided. Advantageous conditions with respect to residue-free and efficient comminution result if a nozzle for introducing spray mist is associated with the comminuting assembly, whereby the dust produced during comminution can be bound. In addition, it can be advantageous if the comminuting assembly, or a section of the housing in which the comminuting assembly is arranged, is cooled, which promotes comminution of not yet cured composite material waste. The temperature control zone, also located in the working chamber, is a reaction chamber in which the comminuted composite material waste is thermally and/or chemically treated. Preferably, the temperature of the temperature control zone, as well as the residence time of the composite material waste in the temperature control zone, is selected such that the toxic pollutants, for example solvents, are expelled. This results in crosslinking of the prepregs and reduction of toxicity and flammability of the composite material waste of all types according to the invention. In order to achieve only curing and not combustion of the composite components, such as synthetic resins, the temperature in the temperature control zone is varied depending on the composite material waste in order to obtain a processed product with the highest possible calorific value, which can be used, for example, as a reducing agent, carbon carrier, carburizing agent or fuel in the blast furnace route or in the steel mill. In the simplest case, the forming unit downstream of the temperature control zone in the process chain can be a pelleting press, although it is also conceivable that the forming unit is used only for packaging, i.e. for filling waste bags with unpressed composite material waste. If packaging of unpressed composite material waste is to be carried out, an arrangement of a vibrating plate, a jaw crusher or a shredder can be provided between the temperature control zone and the forming unit, whereby the flowability of the composite material waste is increased.

In order to comply with the officially specified annual and daily average values with regard to pollutants that are hazardous to human health, in particular respirable pollutants, it is proposed that a particle separator is assigned to the comminuting assembly for separating the dusts generated during comminution, with a conveying line being connected to the particle separator in order to separate the dust generated during comminution. The conveying line can be designed as a closed circuit within the working chamber. However, since strong heat can be generated during comminution, for example, the conveying line can break through the working chamber at a first fresh air supply line and connect this fresh air supply line to the particle separator via the comminuting assembly. In this case, the air drawn in serves to cool the comminuting assembly and at the same time transports the dusts produced to the particle separator, where the respirable pollutants are separated. The cleaned air is either circulated within the working chamber or leaves it via an exhaust air line. For example, cyclones or filtering separators can be provided as particle separators. Advantageously, the filtering separators are designed as ceramic filters, since this avoids static charging by the carbon and glass fiber-reinforced waste and promotes cleaning of the resulting filter cake.

In order to produce a product that is as homogeneous as possible even when processing composite material waste of different material properties, and at the same time to design the process chain in such a way that the product yield of the device according to the invention or the associated process is maximized, the particle separator can have a metering device for adding the separated particles, possibly mixed with a binder, to the comminuted composite material waste. In this way, the dust produced during comminution is reintroduced into the process, recycled and, especially when mixed with a binder or water, acts as a bonding agent for the chemically and thermally treated composite material waste. In this way, even highly diverse composite material waste, such as prepregs, fiber materials, resin residues and goods to be recycled, can be recycled into a homogeneous end product.

Particularly favorable process conditions result if the temperature control zone has a conveying device for conveying the comminuted composite material waste through the temperature control zone to the forming unit. The conveying device can, for example, be a screw conveyor, a conveyor belt or an oscillating conveyor. The latter can also be used for classifying composite material waste of different particle sizes.

In order to allow easy removal of the processed product from the device, it is proposed that a storage space connected to the working chamber via a lock is provided for intermediate storage of the composite material waste compacts. Accordingly, the storage space is separated from the actual working chamber, whereby safe access thereto is possible at any time. In the simplest case, the lock can be a sealed flap. The removal of the prepared product can take place either batchwise or continuously. In a preferred embodiment of the device according to the invention, the storage space can be temperature-controlled, which ensures complete crosslinking or curing of the packaged and prepared composite material waste. In this way, for example, not yet fully cured composite material waste can be used as a binder substitute prior to forming or pressing. In this case, complete crosslinking is only achieved in the storage room.

In order that the device can be operated in a largely automated manner, it is recommended in a particularly practicable embodiment of the device according to the invention that sensors connected to a regulating unit are assigned to the comminuting assembly, the temperature control zone and the particle separator for measuring composite material waste and process parameters, wherein the operating parameters at least of the comminuting assembly, in the temperature control zone and of the forming unit can be regulated via the regulating unit as a function of the measured process parameters. Process parameters can be, for example, the number of revolutions of the rotors used in the comminuting assembly, the temperature in the temperature control zone and in the comminuting assembly, the conveying speed of the conveying device arranged in the temperature control zone, the residence time of the composite material waste in the temperature control zone, the pressure applied by the forming unit to produce the composite material waste compacts, the pressure drop in the particle separator, pollutant concentration or loading of the exhaust air and other process parameters that are obvious to the person skilled in the art and relevant for process regulation. Composite material waste parameters can be, for example, particle diameter, bulk density, calorific value, and other composite material waste parameters obvious to the person skilled in the art and relevant to the evaluation of composite material waste characteristics. The recorded data are recorded by the regulating unit, processed and used to set the operating parameters based on predetermined target values. The target values can vary depending on the type of composite material waste.

The device can be used to carry out a method for preparing composite material waste, in particular carbon fiber-reinforced and glass fiber-reinforced waste, in which the composite material waste is comminuted in a first method step by a comminuting assembly, then tempered in a temperature control zone and subsequently pressed by a forming unit to form composite material waste compacts, characterized in that the method steps are carried out in an at least substantially hermetically sealed and transportable working chamber.

In order to increase the added value in the processing of composite material waste, it is proposed that the dust generated during the shredding of composite material waste is extracted and separated in a particle separator, after which the separated dust is added to shredded composite material waste via a metering device.

Extensive automated regulation of the method according to the invention can be achieved if the regulation of the operating parameters at least of the comminuting assembly, in the temperature control zone and of the forming unit is carried out via a regulating unit as a function of composite material waste and process parameters recorded by sensors.

The regulation of the method according to the invention is particularly precise if, on the basis of the composite material waste and process parameters recorded by the sensors, a process simulation stored on a computer unit is carried out, after which the virtual operating parameters are optimized by parameter variation and solutions found are used to regulate the comminuting assembly, the operating parameters of the temperature control zone and the forming unit with the regulating unit. Based on the composite material waste parameters, a so-called virtual twin of the composite material waste to be processed is modeled, the processing of which is calculated by means of process simulation and the recorded operating parameters. By varying the parameters, the operating parameters required to achieve specified target values, for example the calorific value of the processed product or limit values for pollutants discharged via the exhaust air, can be calculated and used by the regulating unit to regulate the real units (comminuting assembly, temperature control zone, conveying device, forming unit, particle separator). The calculated data for process optimization can be stored on a central memory and used to regulate the method according to the invention of other devices according to the invention. This allows a plurality of devices according to the invention to communicate with each other and learn from each other in the sense of artificial intelligence, thus achieving continuous process optimization. It probably does not need to be explained in more detail that the aforementioned process simulation with the aid of a virtual twin is not limited to a method for preparing composite material waste, in particular carbon fiber-reinforced waste.

BRIEF DESCRIPTION OF THE INVENTION

In the drawing, the subject matter of the invention is shown by way of example, wherein:

FIG. 1 shows a partially intersected side view of a device according to the invention for preparing composite material waste, in particular carbon fiber-reinforced waste, and FIG. 2 shows a further embodiment of the device, wherein for reasons of clarity the particle separator and the truck for transporting the device are not shown.

DETAILED DESCRIPTION OF THE PREFERRED EMBODIMENTS

A device according to the invention has a substantially hermetically sealed and transportable working chamber 1, in which a comminuting assembly 2, a temperature control zone 3 and a forming unit 4, which can also be used exclusively for packaging the composite material waste, are arranged.

The comminuting assembly 2 is connected to a particle separator 6, for example a filtering separator, via a conveying line 5, whereby the dust produced during comminution is separated and not discharged via the exhaust air line 7*a*.

A metering device 8 may be associated with the particle separator 6, which applies the separated dust, after it has been mixed with a binder taken from a binder supply container 9, to the shredded composite material waste.

The temperature control zone 3 has a conveying device 10 for conveying the comminuted composite material waste through the temperature control zone 3 to the forming unit 4. The temperature in the temperature control zone can be adjusted by means of a heating coil 11. The tempering unit is to be regarded as a reaction chamber in which toxic substances are expelled from the composite material waste and thermally treated. The expelled gases leave the working chamber 1 via an exhaust air line 7*b* after having been aftertreated by an air purification system 12, if necessary.

The working chamber 1 can also be adjoined by a storage space 13, which is separated from the working chamber 1 by a flap 14 acting as a lock, analogous to the comminuting assembly 2. Access to the storage space 13 is provided by an entrance 15.

For extensive automation and optimization of the process regulation, sensors 16 for measuring composite material waste and process parameters are assigned to the comminuting assembly 2, the temperature control zone 3, the particle separator 6, which are connected to a regulating unit 17. The regulating unit 17 can transmit the determined data to a computing unit 18 and regulate the comminuting assembly 2, the temperature control zone 3, the conveying device 10, the forming unit 4, the particle separator 6, flow machines 19 and any valves that are not shown, on the basis of predetermined target values. The computing unit 18 can also be used to communicate with other computing units of other devices according to the invention, whose determined data can also be used for process optimization.

As can be seen from FIG. 2, the temperature control zone 3 can be divided into several temperature control zones 3*a*, 3*b*, 3*c* of different temperatures by optional separating devices 20. The individual temperature control zones 3*a*, 3*b*, 3*c* are tempered by respectively assigned heating coils 11*a*, 11*b*, 11*c*. The air or process gas flow can be regulated by valves 21 of the exhaust air line 7*b*, so that process gas of different temperature can be recirculated through the air purification system 12 into the housing of the comminuting assembly 2. In this way, the curing and crosslinking of the composite material waste, in particular carbon fiber-reinforced waste, can be regulated via the process gas circulation.

FIG. 2 also illustrates a possible combination of several comminuting assemblies 2. In this case, a guillotine is used for uncured materials, in particular prepregs, followed by a shredder for cured materials.

The invention claimed is:

1. A device for preparing composite material waste, said device comprising:
    a comminuting assembly comminuting the composite material waste,
    a downstream temperature control zone controlling a temperature of the comminuted composite material waste, and
    wherein the comminuting assembly, and the temperature control zone, are arranged in a transportable working chamber that is substantially hermetically sealed,
    wherein a particle separator separating a dust generated during comminution is associated with the comminuting assembly, and wherein a conveying line is connected to the particle separator so as to separate the dust generated during comminution, and
    wherein sensors connected to a regulating unit measuring composite material waste and process parameters are associated with the comminuting assembly, the temperature control zone, and the particle separator, wherein the operating parameters of the comminuting assembly, in the temperature control zone are regulated by the regulating unit as a function of the measured process parameters.

2. The device for preparing composite material waste according to claim 1, wherein the particle separator has a metering device adding the separated particles to the comminuted composite material waste.

3. The device according to claim 2, wherein the separated particles are mixed with a binder when added to the comminuted composite material waste.

4. The device for preparing composite material waste according to claim 1, wherein the temperature control zone comprises a conveying device conveying the comminuted composite material waste through the temperature control zone to the forming unit.

5. The device for preparing composite material waste according to claim 1, wherein a storage space is connected via a lock to the transportable working chamber so as to provide intermediate storage of the composite material waste compacts.

6. The device of claim 1, wherein the composite material waste is carbon fiber-reinforced waste.

7. A device for preparing composite material waste, said device comprising:
a comminuting assembly comminuting the composite material waste, a downstream temperature control zone controlling a temperature of the comminuted composite material waste, and comprising a forming unit producing composite material waste compacts,
wherein the comminuting assembly, the temperature control zone, and the forming unit are arranged in a transportable working chamber that is substantially hermetically sealed;
wherein a particle separator separating a dust generated during comminution is associated with the comminuting assembly, and wherein a conveying line is connected to the particle separator so as to separate the dust generated during comminution; and
wherein sensors connected to a regulating unit measuring composite material waste and process parameters are associated with the comminuting assembly., the temperature control zone, and the particle separator, wherein the operating parameters of the comminuting assembly, in the temperature control zone and of the forming unit are regulated by the regulating unit as a function of the measured process parameters.

8. A method for preparing composite material waste, said method comprising
comminuting the composite material waste in a first method step using a comminuting assembly, and
controlling a temperature of the comminuted composite material waste in a temperature control zone,
wherein the method is carried out in a substantially hermetically sealed and transportable working chamber, and the method further comprises
separating a dust generated during comminution with a particle separator that is associated with the comminuting assembly, wherein a conveying line is connected to the particle separator so as to separate the dust generated during comminution, and
measuring composite material waste and process parameters with sensors connected to a regulating unit and associated with the comminuting assembly, the temperature control zone, and the particle separator,
wherein operating parameters of the comminuting assembly, in the temperature control zone, are regulated via a regulating unit as a function of composite material waste and process parameters recorded by the sensors.

9. The method for preparing composite material waste according to claim 8, wherein dust produced during comminution of the composite material waste is extracted and separated in a particle separator, after which the separated dust is added to comminuted composite material waste via a metering device.

10. The method of claim 8, wherein the composite material waste is carbon fiber-reinforced waste.

11. A method for preparing composite material waste, said method comprising
comminuting the composite material waste in a first method step using a comminuting assembly,
controlling a temperature of the comminuted composite material waste in a temperature control zone, and
subsequently pressing the composite material waste using a forming unit so as to form composite material waste compacts,
wherein the method is carried out in a substantially hermetically sealed and transportable working chamber; and the method further comprises
separating a dust generated during comminution with a particle separator that is associated with the comminuting assembly, wherein a conveying line is connected to the particle separator so as to separate the dust generated during comminution, and
measuring composite material waste and process parameters with sensors connected to a regulating unit and associated with the comminuting assembly, the temperature control zone, and the particle separator,
wherein operating parameters of the comminuting assembly, in the temperature control zone, and of the forming unit are regulated via a the regulating unit as a function of composite material waste and process parameters recorded by the sensors.

12. The method for preparing composite material waste according to claim 11, wherein, on the basis of the composite material waste and process parameters recorded by the sensors, a process simulation stored on a computing unit is carried out, after which virtual operating parameters are optimized by parameter variation, and solutions derived by said optimization are used to regulate the comminuting assembly, the operating parameters of the temperature control zone, and the forming unit with the regulating unit.

* * * * *